Aug. 19, 1958 — O. G. KOPPIUS — 2,848,644
THERMIONIC CATHODE
Filed Jan. 19, 1953

INVENTOR
OTTO G. KOPPIUS
BY
AGENT

2,848,644

THERMIONIC CATHODE

Otto G. Koppius, White Plains, N. Y., assignor, by mesne assignments, to North American Philips Company, Inc., New York, N. Y., a corporation of Delaware Application January 19, 1953, Serial No. 331,874

10 Claims. (Cl. 313—346)

My invention relates to a thermionic cathode containing a supply of material furnishing upon reduction free alkaline earth metal to an electron emissive surface of the cathode and to a method of making such a cathode.

A main object of my invention is to provide a cathode structure containing a supply of alkaline earth material capable of furnishing to an electron-emissive surface of the cathode free alkaline earth metal which cathode is non-hygroscopic and unaffected by immersion in water.

Another object of my invention is to provide a cathode structure having improved electron-emissive properties.

Another object of my invention is to provide an improved cathode containing a supply of alkaline earth material capable of furnishing to an electron emissive surface of the cathode free alkaline earth metal which requires no activation and emits immediately when positioned in a discharge tube and heated.

Another object of my invention is to provide a cathode structure employing alkaline earth compounds which are more stable and can be stored for greater lengths of time.

Another object of my invention is to provide a cathode structure in which the alkaline earth compound is in intimate contact with surrounding refractory metal and yet in which deleterious reactions between the alkaline earth compound and the refractory metal substantially do not occur.

These and further objects of my invention will appear as the specification progresses.

In accordance with my invention, I employ an alkaline earth tungstate, preferably $BaWO_4$ as the source of alkaline earth metal whether it is in the form of a pellet embedded in a surrounding structure of refractory metal, as a powder in a large internal cavity of a body having a wall constituted of porous refractory metal or in intimate contact with the refractory metal itself. The tungstate ($MWO_4$, M being one or more of the alkaline earth metals barium, strontium and calcium) ordinarily is not reducible by a refractory metal such as tungsten. I have found, however, that by mixing with the tungstate a metal having a stronger reducing action than the refractory metal, alkaline earth metal will be produced in sufficient quantity to form a film approximately one molecule in thickness at the surface of the cathode.

While I do not wish to be limited to any explanation as to the mechanism by which the monomolecular film of alkaline earth metal is formed on the cathode surface, I believe that the active reducing metal, which may be thorium, reduces the tungstate to free alkaline earth metal which migrates through the porous structure of the refractory metal and forms a monomolecular layer on the surface of the cathode.

While I prefer to use as a refractory metal tungsten, other heat-refractory metals such as molybdenum, tantalum, niobium or hafnium may be used. Similarly, in connection with tungsten as the refractory metal, I also prefer to use thorium as the active reducing metal but other metals such as Zr and Ta also will reduce the tungstate.

The major advantage of using a tungstate is that it is non-hydgroscopic. It is so stable that cathodes made according to my invention can be immersed in water and after removal placed in a tube and will function as though they had not been immersed in water. The cathodes according to my invention also require no activation since they are ready to emit as soon as they are positioned in an evacuated discharge tube and heated since the tungstates are subject to immediate reduction by the thorium with the release of free alkaline earth metal.

The invention will be described in detail with reference to the accompanying drawing in which.

Figure 1:
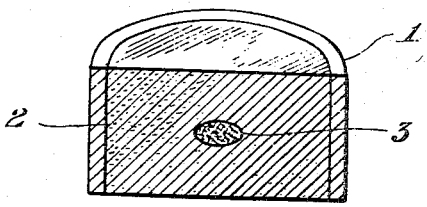
Fig. 1 is a sectional view in perspective of one type of cathode structure according to the invention.
Figure 2:
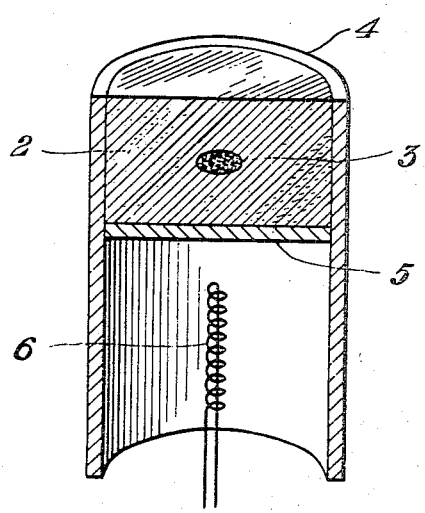
Fig. 2 is a sectional view in perspective of another cathode of the type shown in Fig. 1.

The cathodes of the type shown in Figs. 1 and 2 in which similar parts are identified by like reference numerals comprise a retaining member 1 in the form of a tubular ring of molybdenum. Within the retaining member there is a mass of porous sintered tungsten 2 in which a pellet 3 composed of $BaWO_4$ and thorium is embedded in intimate contact with the tungsten mass. The pores in the tungsten mass are the largest apertures connecting the pellet with the outside of the cathode.

In Fig. 2, the porous sintered tungsten mass is secured to the upper cup-shaped portion of a tubular member 4 having a partition 5 which prevents emission into the lower part of the tube in which a heating filament 6 is provided.

Figure 3:
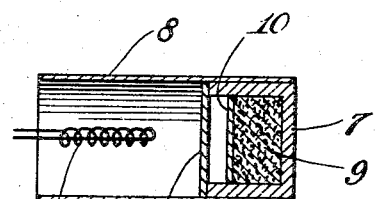
Fig. 3 is a side view in section of another type of cathode according to the invention.

The cathode shown in Fig. 3 comprises a cup-shaped member 7 consisting of porous sintered tungsten secured to a tube 8 consisting of a refractory metal such as molybdenum and forming therewith an internal cavity tightly sealed by wall 10 except for the pores in the end wall of the tungsten cup which provide the largest passageways connecting the cavity to the surface of the cathode. Within the cavity is disposed a mixture 9 of $BaWO_4$ and thorium. A partition 11 of heat-refractory metal such as molybdenum separates the cup-shaped tungsten member 7 from the bottom portion of the tube in which is disposed a heater 12.

Figure 4:
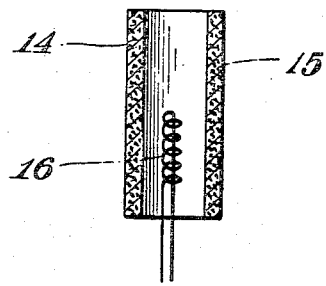
Fig. 4 is an elevational view of still another type of cathode according to the invention.

A cathode of the type in which the $BaWO_4$ and thorium are in intimate contact with the tungsten is shown in Fig. 4. The cathode comprises a tube 14 consisting of a pressed mixture of tungsten, $BaWO_4$ and thorium powders. A heater 16 is provided in the interior of the tube.

The following table shows the emission in amperes/$cm.^2$ obtainable with several cathodes made according to the invention and the life of the cathodes.

Each of the cathodes contain about 10% by weight of $BaWO_4$, about 10% by weight of thorium and the balance tungsten. The cathodes were operated at a temperature of about 950° C. (optical). Emission currents were measured pulse-wise.

| Code No. | Life-hours | Emission amps./cm.$^2$ |
|---|---|---|
| P-319 | 3,936 | 1.25 |
| P-320 | 3,960 | 1.18 |
| P-321 | 3,960 | 2.78 |
| P-339 | 3,432 | 1.60 |
| P-340 | 3,432 | 2.78 |
| P-341 | 3,432 | 1.92 |
| P-342 | 3,432 | 3.50 |
| K-37 | 3,504 | 1.95 |
| K-39 | 3,528 | 2.78 |
| K-40 | 3,548 | 1.39 |

For greater mechanical stability a cathode of the type in which the BaWO$_4$-thorium mixture is in intimate contact with the tungsten can be made by first forming a body of tungsten powder and about 10% by weight of thorium powder by pressing. The body is fired at a sufficiently high temperature, for example, of the order of 1300° to 2000° C. to sinter the tungsten and thorium particles into a compact but porous mass. This body, if desired, may then be machined to close dimensional tolerances in accordance with the method described in U. S. Patent 2,669,008 to Robert Levi. The sintered, and if desired machined, body is then impregnated by placing a pellet of BaWO$_4$ on the body and melting the tungstate at about 1550° C. in a vacuum furnace. A cathode made by this method had a life of over 900 hours at a current density of 1.32 amperes/cm.$^2$ operating at a temperature of about 950° C.

While I have thus described my invention with specific examples and applications thereof, other modifications will be readily apparent to those skilled in the art without departing from the spirit and scope of my invention as defined in the appended claims.

What I claim is:

1. A thermionic dispenser cathode comprising a body of refractory metal having a porous portion, and a supply within said body of a mixture of an alkaline earth metal tungstate and a refractory metal different from that of said body and selected from the group consisting of thorium, tantalum and zirconium.

2. A thermionic dispenser cathode comprising a body of refractory metal having a porous portion, and a supply within said body of a mixture of an alkaline earth metal tungstate and thorium.

3. A thermionic dispenser cathode comprising a body of refractory metal having a porous portion, and a supply within said body of a mixture of an alkaline earth metal tungstate and tantalum.

4. A thermionic dispenser cathode comprising a body of refractory metal having a porous portion, and a supply within said body of a mixture of an alkaline earth metal tungstate and zirconium.

5. A thermionic dispenser cathode comprising a porous body of refractory metal and a supply within said body of a mixture of an alkaline earth metal tungstate and a refractory metal different from that of said body and selected from the group consisting of thorium, tantalum and zirconium.

6. A therionic dispenser cathode comprising a porous body of tungsten and a supply within said body of a mixture of an alkaline earth metal tungstate and a refractory metal different from that of said body and selected from the group consisting of thorium, tantalum and zirconium.

7. A thermionic dispenser cathode comprising a porous body of tungsten and a supply within said body of a mixture of an alkaline earth metal tungstate and thorium.

8. A thermionic dispenser cathode comprising a porous body of tungsten and a supply within said body of a mixture of an alkaline earth metal tungstate and tantalum.

9. A thermionic dispnser cathode comprising a porous body of tungsten and a supply within said body of a mixture of an alkaline earth metal tungstate and zirconium.

10. A method of manufacturing a thermionic dispenser cathode comprising the steps, pressing a mixture of tungsten and thorium powders into a body, sintering the pressed body to produce a firmly coherent yet porous body, melting an alkaline earth metal tungstate, and impregnating the pores of said sintered body in a vacuum with said molten tungstate.

References Cited in the file of this patent

UNITED STATES PATENTS

| | | |
|---|---|---|
| 1,922,244 | Hunter | Aug. 15, 1933 |
| 2,147,447 | Kolligs | Feb. 14, 1939 |
| 2,175,345 | Gaidies et al. | Oct. 10, 1939 |
| 2,501,089 | Pomeranz | Mar. 21, 1950 |
| 2,524,001 | Spencer | Sept. 26, 1950 |
| 2,543,728 | Lemmens et al. | Feb. 27, 1951 |
| 2,624,024 | Jansen et al. | Dec. 30, 1952 |
| 2,647,216 | Brown | July 28, 1953 |
| 2,700,118 | Hughes et al. | Jan. 18, 1955 |
| 2,716,716 | Hughes | Aug. 30, 1955 |
| 2,722,626 | Coppola | Nov. 1, 1955 |